June 21, 1932. J. S. TENBROOK 1,864,103
AUTOMATIC GEAR SHIFT
Filed March 17, 1931 3 Sheets-Sheet 3

Inventor
Jesse S. Tenbrook
By Watson E. Coleman
Attorney

Patented June 21, 1932

1,864,103

UNITED STATES PATENT OFFICE

JESSE S. TENBROOK, OF OAKLAND, CALIFORNIA

AUTOMATIC GEAR SHIFT

Application filed March 17, 1931. Serial No. 523,331.

This invention relates to motor vehicles and more particularly to an attachment for a vehicle whereby to provide a substantially automatic gear shift.

An object of this invention is to provide an attachment which may be attached to any conventional motor vehicle whereby the gear shifting is accomplished simultaneous with the rocking of the clutch pedal.

The above and various other objects and advantages of this invention will in part be described in and in part be understood from the following detailed description of the present preferred embodiment, the same being illustrated in the accompanying drawings, wherein:—

Figure 6 is a fragmentary side elevation of the releasable locking means which rock with the rocking of the clutch pedal; and Figure 7 is a sectional view taken on the line 7—7 of Figure 1.

Figure 1:
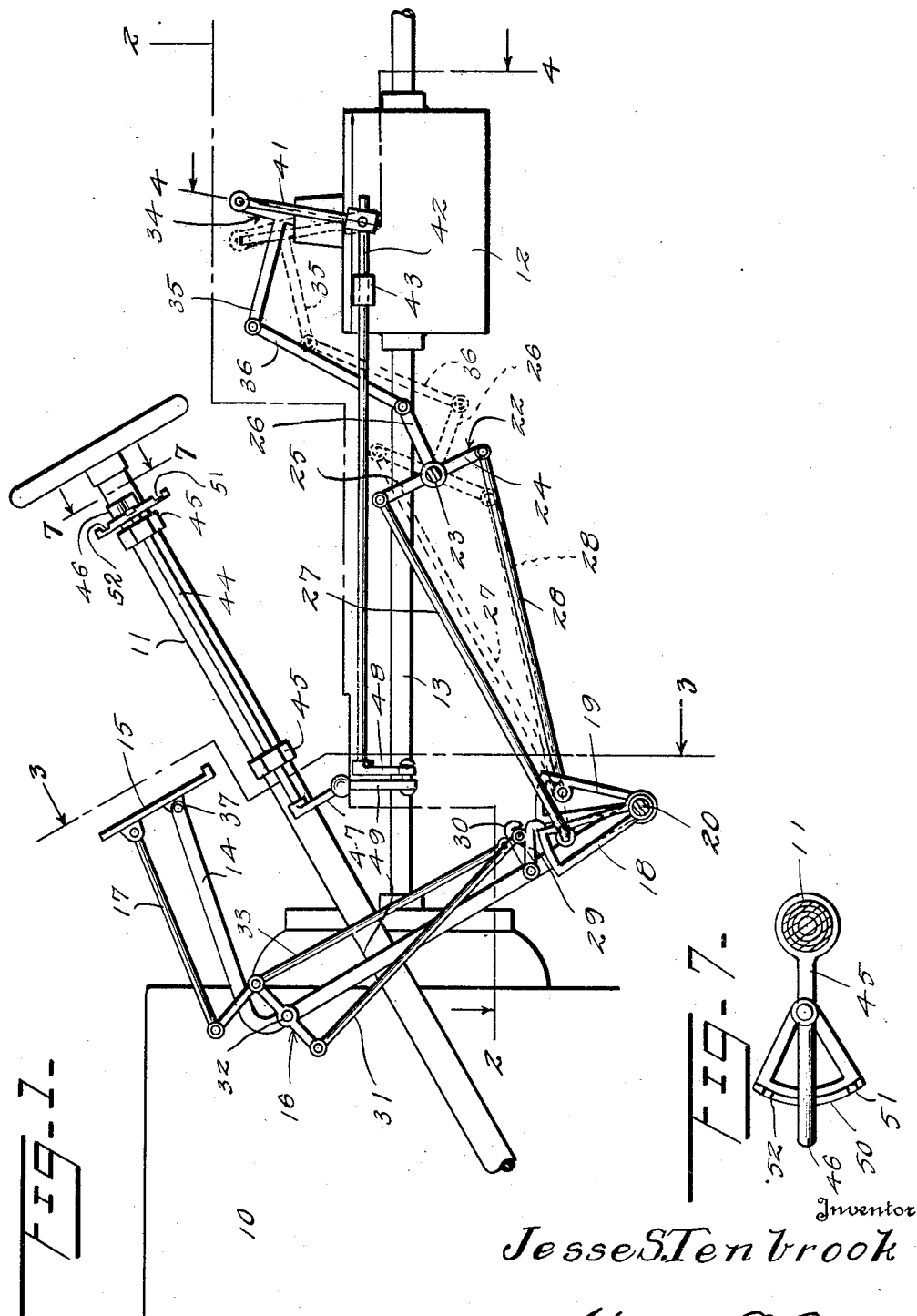
Figure 1 is a detail side elevation of a device constructed according to the preferred embodiment of this invention mounted on a motor vehicle which is shown in fragmentary form.
Figure 2:
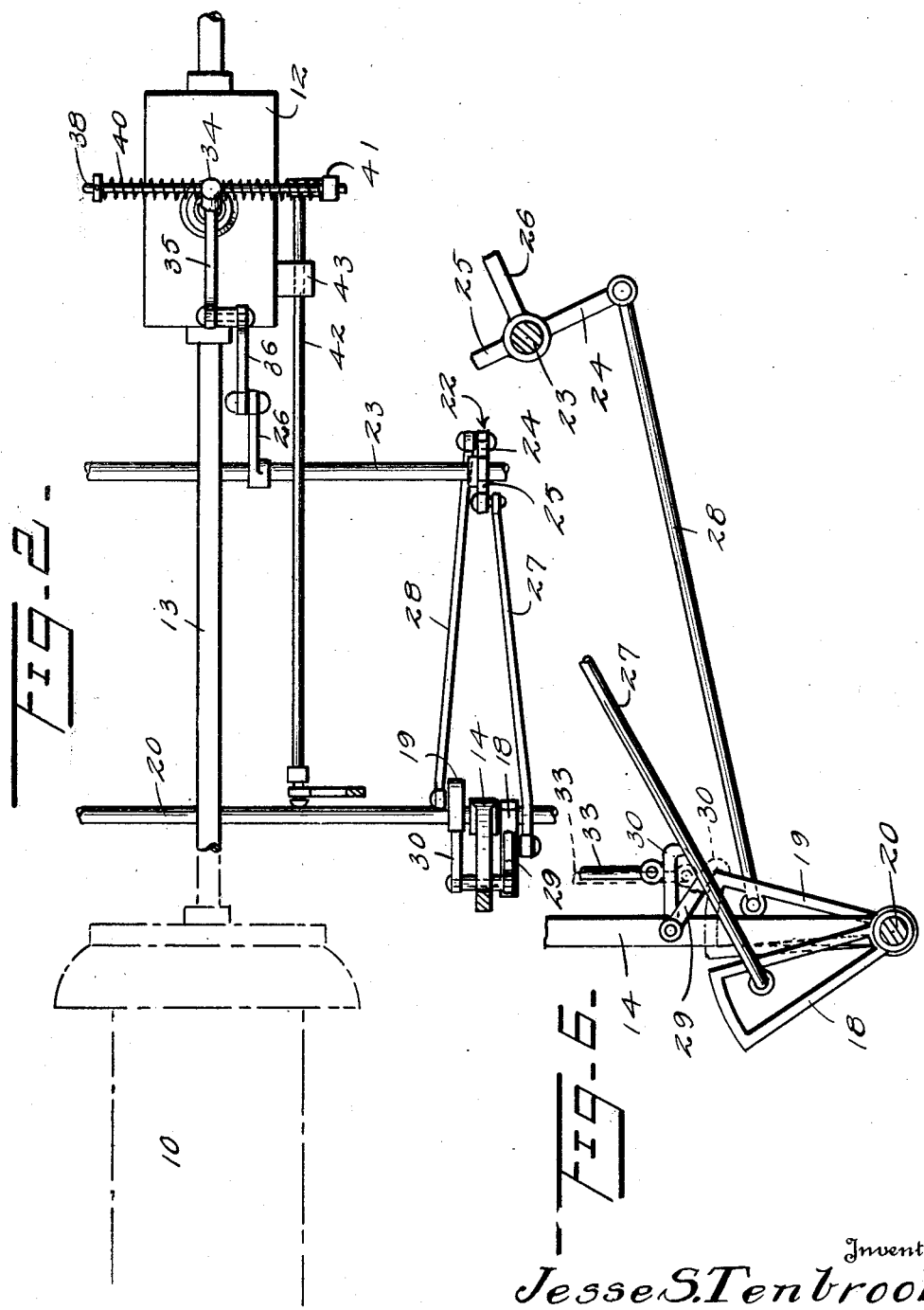
Figure 2 is a detail plan view partly in section taken on the line 2—2 of Figure 1.
Figure 3:
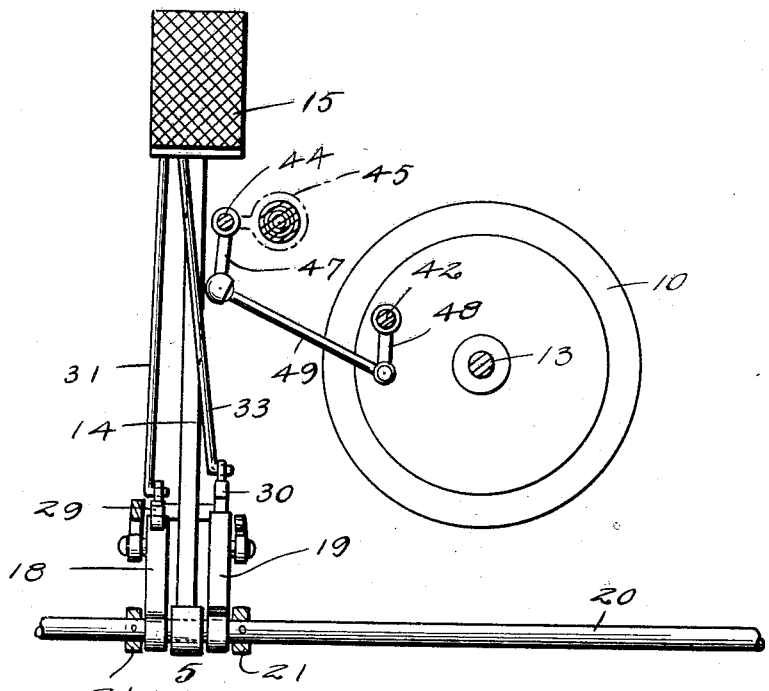
Figure 3 is a sectional view partly in detail taken on the line 3—3 of Figure 1.
Figure 4:
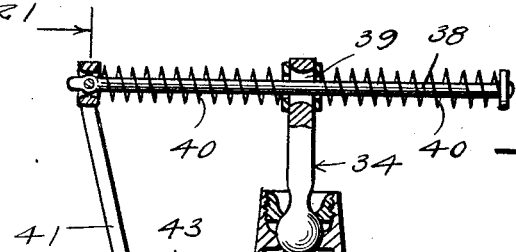
Figure 4 is a sectional view partly in detail taken on the line 4—4 of Figure 1.
Figure 5:
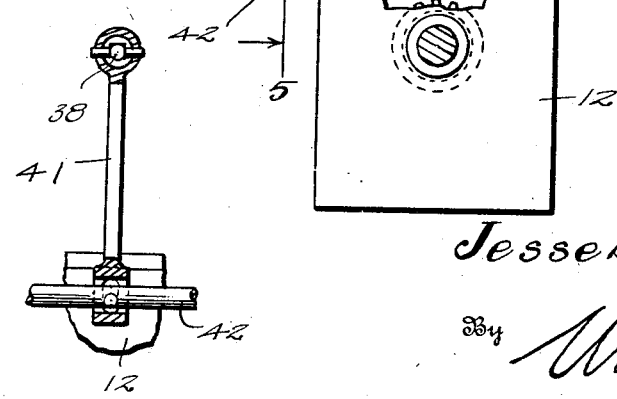
Figure 5 is a sectional view taken on the line 5—5 of Figure 4.

Referring to the drawings wherein like numerals of reference designate corresponding parts throughout the several views, the numeral 10 designates generally a motor vehicle frame or chassis having a conventional steering column 11 and a transmission 12 which is connected to the engine by means of the drive shaft 13. In the shifting of the gears in the conventional transmissions at present available, a hand operated gear shift lever is used, and in order to provide a substantially automatic means for shifting the gears of the transmission 12 simultaneously with the rocking of the clutch pedal 14, I have provided a gear shifting attachment which is operatively connected with the clutch pedal 14 and the transmission 12. This gear shifting mechanism comprises a rockable foot pedal 15 which is rockably secured to the clutch pedal member 14. A substantially L-shaped member 16 is rockably mounted on the pedal 14 and connected to the pedal member 15 by means of a link 17 or the like.

A pair of V-shaped members 18 and 19 are loosely mounted on the clutch shaft 20 and are held against longitudinal movement on the shaft 20 by means of collars or ring members 21. A rockable member generally designated as 22 is mounted on a rock shaft 23 disposed within the frame of the vehicle 10 and forwardly of the transmission 12. This member 22 comprises a pair of arms 24 and 25 which are secured to the shaft 23 in substantial alinement with each other, and a third arm 26 is secured to the shaft 23 at a point inwardly from the member 22.

The arm 25 is connected to the rockable member 18 by means of a link 27. In like manner, the arm 24 is connected to the rockable member 19 by means of a link 28. The rocking movement of the rock members 18 and 19 simultaneously with the rocking of the clutch pedal 14 is accomplished by means of releasable pawl members 29 and 30 which are rockably mounted on one leg of the clutch pedal 14 adjacent the members 18 and 19, the pawl member 29 being mounted on one side of the clutch pedal for engagement with the rockable member 18 which is mounted on the same side, and in like manner, the pawl member 30 is mounted on the opposite side of the clutch pedal 14 and is adapted for releasable engagement with the rockable member 19. The pawl member 29 is connected to the L-shaped member 16 by means of a connecting link 31, and the pawl member 30 is connected to this L-shaped member 16 on the opposite side of the pivot 32 thereof by means of a connecting link 33.

In vehicles having the conventional transmission, the gear shifting lever extends upwardly through the floor of the car but by means of the device herein disclosed, the gear shifting lever, generally designated as 34, is cut off below the floor so that it may have free movement beneath the floor, and this shortened gear shifting lever 34 is provided with a forwardly extending arm 35 which is connected to the rearwardly extending arm 26 by means of a connecting link 36. In this manner, the gear shifting lever 34 can be rocked either forwardly or rearwardly by tilting the foot pedal 15 either downwardly or upwardly on the pivot 37 thereof. This tilting movement will bring one of the pawl members 29 or 30 into engagement with one of the rockable members 18 or 19 and thereby rock the gear shifting lever 34 either forwardly or rearwardly.

In the conventional transmissions, in addition to the forward and rearward rocking of the gear shifting lever 34, it is necessary to shift the lever laterally so that the gears can be shifted from low or first into intermediate speed or second, which is accomplished by rocking the gear shifting lever 34 forwardly and laterally. In order to swing the lever 34 laterally, I have provided a shaft 38 which is loosely mounted in an opening 39 in the gear shifting lever 34, and this shaft 38 is held in tensioned position by means of expanding springs 40 or the like which extend about the shaft 38 and constantly urge the shifting lever 34 centrally of the shaft 38.

A rock arm 41 is rockably connected at one end to one end of the shaft 38 and the opposite end of the arm 41 is mounted on a shaft or rod 42 which extends forwardly of the transmission 12. A bracket 43 may be attached to the transmission 12 so as to hold the rock shaft 42 in outstanding relation to the transmission 12. An operating shaft 44 is pivotally mounted on the steering column 11 by means of bracket members 45 or the like, and is provided at the upper end thereof with a lever 46 which upon rocking thereof will rock the operating shaft 44. A lever or arm 47 is secured to the lower end of the operating shaft 44, and and in like manner, a lever or arm 48 is secured to the forward end of the rock shaft 42 and these levers or arms 47 and 48 are connected by means of a connecting link 49 so that the rocking movement of the operating shaft 44 will simultaneously rock the shaft 42 so as to impart lateral movement to the shaft 38.

A segmental member or web 50 is mounted on the steering column 11 and is provided with spaced notches 51 and 52 within which the operating lever 46 is adapted to be seated so as to hold the shifting shaft 38 in desired position for shifting the gear shifting lever 34 laterally.

In the operation of this device, in order to shift the gears of the transmission 12 so as to move the vehicle forwardly, the operating lever 46 is swung so as to engage in the recess 52 of the segmental member 50. In this position, the shifting arm 41 is rocked inwardly toward the transmission 12 and one of the spring members 40 is placed under tension while the tension of the other of the spring members 40 is loosened. The clutch pedal 14 may then be moved forwardly in the conventional manner and when the clutch pedal 14 has been rocked forwardly a sufficient degree so as to disengage the clutch, the foot pedal 15 may be rocked forwardly at the upper end thereof so as to bring the pawl member 29 into locking engagement with the rockable member 18. This connection will rock the gear shifting lever 34 rearwardly into low gear. When the vehicle 10 has acquired sufficient momentum, the clutch pedal 14 may be again positioned forwardly and the low or rear end of the foot pedal 15 rocked so as to move the link 17 upwardly and bring the pawl member 30 into engagement with the rockable member 19. This rocking movement will simultaneously disengage the pawl member 29 from the member 18 and will rock the gear shifting lever 34 forwardly. When the shifting lever 34 is moved forwardly into the neutral position, the spring 40 which is under considerable tension will slide the lever 34 laterally so that additional forward movement of the clutch pedal 14 will swing the gear shifting lever 34 into the intermediate or second gear. In the shifting from second to high, the operating lever 46 may be left in the notch 52 and the clutch pedal 14 rocked forwardly. The foot pedal 15 is then tilted forwardly so as to move the link member 17 downwardly, thereby disengaging the pawl member 30 from the rockable member 19 and swinging the pawl member 29 into engagement with the rockable member 18. The gear shifting lever 34 is then operatively connected with the clutch pedal 14 so that additional forward movement of this clutch pedal 14 will shift the lever 34 from second gear through neutral into high. The springs 40 will hold the shifting lever 34 centrally of the shaft 38 and as this shaft 38 is disposed with the central position to one side of the transmission 12, the springs will hold this shifting lever in desired centrally disposed position.

It will be obvious from the foregoing that the shifting of the gears of the transmission 12 is practically automatic and is made simultaneous with the rocking of the clutch pedal and the foot portion 15 of the pedal. This shifting of the gear lever is accomplished in such a manner as to leave the hands of the operator of the vehicle entirely free for the steering of the vehicle inasmuch as the shifting lever 46 may be set for swinging movement of the shifting lever laterally of the transmission so as to shift the gears for either forward or reverse movement of the vehicle.

It is, of course, understood that various changes and modifications may be made in the details of construction and design of the above specifically described embodiment of this invention without departing from the spirit thereof, such changes and modifications being restricted only by the scope of the following claims.

I claim:—

1. In combination with a transmission, a pair of rockable members loosely mounted on the clutch lever shaft, connecting means connecting each of said members with the transmission shifting lever, one of said members upon rocking thereof swinging said lever in one direction, the other of said members swinging said lever in the reverse direction, selective means mounted on the clutch pedal and engaging each of said members whereby to rock the shifting lever in the selected direction, and manually controlled means operable from a point remote from the transmission and engaging the shifting lever whereby to shift said lever laterally upon movement thereof into neutral position.

2. In combination with a transmission including a gear shifting lever and a rockable clutch pedal, a pair of rockable members loosely mounted on the clutch pedal shaft, a pair of opposed arms supported rearwardly of the members, connecting links connecting each arm to one of the members, another arm rockable with said pair of arms, connecting means connecting said latter arm with the shifting lever and selective means operatively engaged with the clutch pedal and engaging said members for swinging movement of said members simultaneous with the rocking of the clutch pedal.

3. In combination with a transmission including a rockable clutch pedal and a gear shifting lever, a pair of lever operating memberse loosely mounted on the clutch pedal shaft, connecting means connecting each of said members with said lever, said connecting means being adapted to rock said lever in one direction upon rocking of one of said operating members and to rock said lever in the opposite direction upon rocking of the other member, and releasable means carried by the clutch pedal and adapted for engagement with a selected operating member whereby to rock said member simultaneously with the rocking of the pedal.

4. In combination with a transmission including a clutch pedal and a gear shifting lever, a pair of lever operating members loosely mounted on the clutch pedal shaft, means connecting the members with the lever whereby to rock the lever forwardly upon rocking of one of the members and to rock the lever rearwardly upon rocking of the other member in the same direction as the first member, releasable means mounted on the pedal and engaging a selected member whereby to rock the selected member simultaneously with the rocking of the pedal, and manually operable means engaging the lever whereby to shift the lever laterally of the transmission upon movement of the lever into neutral position.

5. In combination with a transmission including a gear shifting lever and a clutch pedal, a pair of lever shifting members loosely mounted on the clutch pedal shaft, connecting means connecting the members with the lever whereby to rock the lever longitudinally of the transmission upon rocking movement of a selected member, a pair of pawl members rockably mounted on said pedal, means for rocking a selected pawl member whereby to engage a selected member for rocking movement thereof simultaneous with the rocking of the pedal, and remotely controlled means engaging the shifting lever whereby to shift the lever laterally and hold said lever in said lateral shifted position upon longitudinal rocking thereof coactively with the rocking of the clutch pedal.

In testimony whereof I hereunto affix my signature.

JESSE S. TENBROOK.